Patented Dec. 18, 1923.

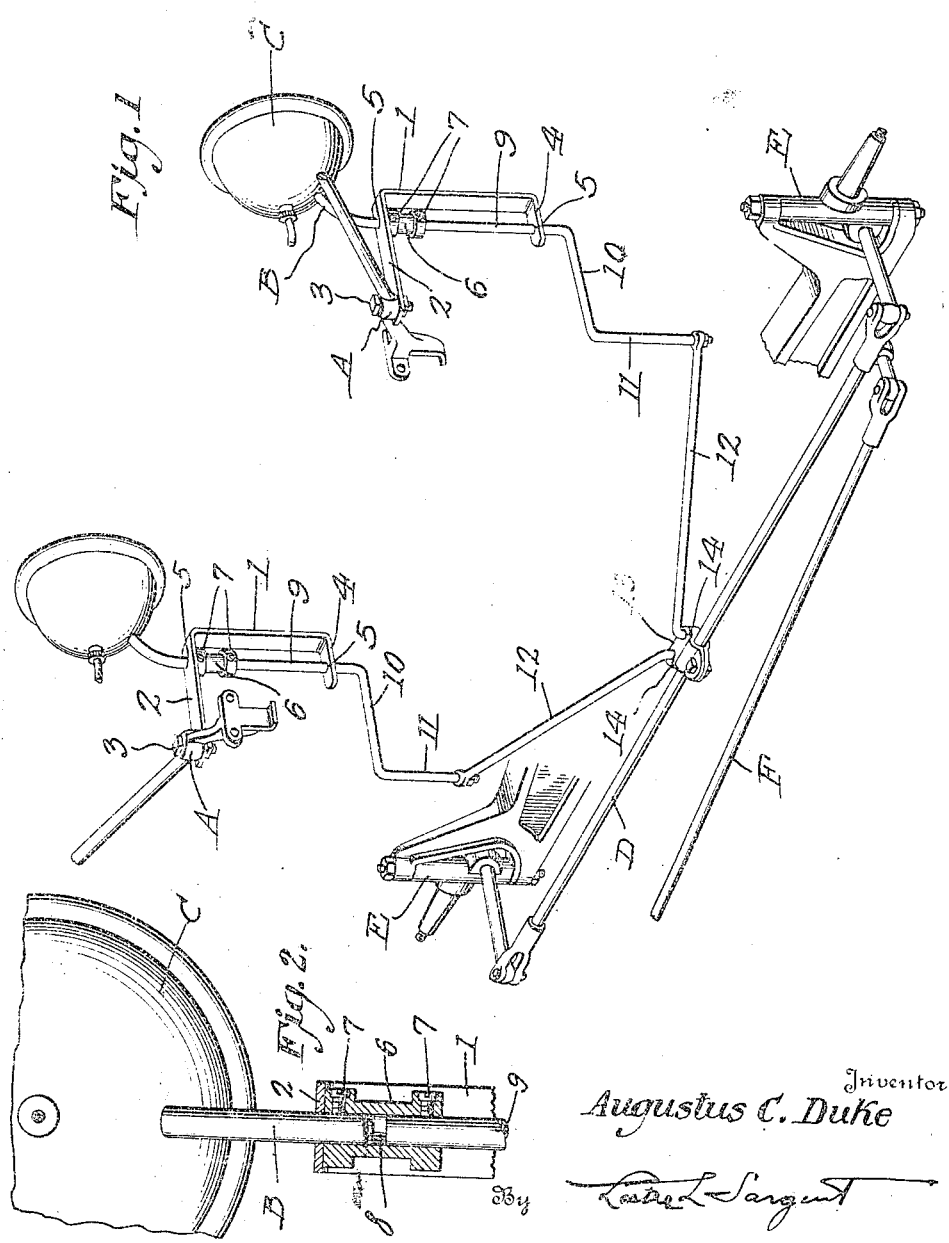

1,478,001

UNITED STATES PATENT OFFICE.

AUGUSTUS C. DUKE, OF CEDARTOWN, GEORGIA, ASSIGNOR OF ONE-HALF TO JAMES M. BURKE, OF CEDARTOWN, GEORGIA.

DIRIGIBLE HEADLIGHT FOR AUTOMOBILES.

Application filed July 5, 1922. Serial No. 572,845.

*To all whom it may concern:*

Be it known that I, AUGUSTUS C. DUKE, a citizen of the United States, residing at Cedartown, in the county of Polk and State of Georgia, have invented a new and useful Dirigible Headlight for Automobiles, of which the following is a specification.

The object of my invention is to provide a very simple attachment which can be readily applied to any Ford automobile whereby the headlights will be dirigible. I attain these and other objects of my invention by the mechanism illustrated in the accompanying drawings, in which—

Figure 1 is a perspective view of the invention; and

Fig. 2 is a detail vertical section view through member 6.

Like characters of reference indicate like parts in each of the views.

Referring to the accompanying drawings, there are shown the conventional brackets A on which the conventional standards B of headlights C are ordinarily mounted with the non-dirigible headlight. The conventional steering arm F connected with the conventional cross rod D connected with steering knuckles E are illustrated in their conventional form and arrangement.

I provide a suitable lamp support arm 2 secured to bracket A by bolt 3. Arm 2 has a downwardly turned section 1 and a lower extension 4 parallel with member 2, the members 2 and 4 having aligned orifices 5. The headlight standard B instead of being mounted in the conventional bracket A is mounted in the orifice 5 of the support arm 2 and is connected by spool link 6 with rod 9. I provide suitable fastening screws 7 in spool link 6 as shown in Fig. 2. Rod 9 has a rearwardly bent section 10 and a downwardly bent section 11 the end of which is swivelly attached to link 12 which latter link has its other end swivelly mounted in the clamp 13 which is adjustably bolted on the steering cross rod D.

As will be understood by referring to Fig. 1, the operation of steering cross rod D will correspondingly operate the headlight, turning it in the direction in which the wheels of the automobile are turned so as to throw the light ahead of the path in which the vehicle is directed, rather than in line with the path in which the front wheels of the vehicle are directed, instead of straight in front of the vehicle regardless of the direction in which it is turning.

I am aware that various dirigible headlights have heretofore been invented. The present device is especially adapted for use on the headlights of Ford automobiles and can be manufactured at a very small expense; and requires only nine parts, of which four are duplicates, for the installation of the device, thus providing a device which can be supplied at the least possible cost.

What I claim is:

In a dirigible headlight for vehicles of the class described, the combination of a supporting arm comprising a forwardly projecting portion a downwardly turned portion and a rearwardly bent portion, said arm having aligned orifices in its parallel portions, a headlight standard swivelly mounted in said supporting arm, a vertically disposed spool link affixed to said standard, a vertically disposed bent rod swivelly mounted in the rearwardly bent portion of the supporting arm and affixed to the aforesaid spool link, a link attached to the lower end of the bent rod, and a clamp to which the other end of the link is swivelly attached, said clamp being secured to a steering element of the vehicle.

AUGUSTUS C. DUKE.

Witnesses:
F. E. GLENN,
J. F. WRIGHT.